(12) United States Patent
Bookstaff

(10) Patent No.: US 8,078,977 B2
(45) Date of Patent: Dec. 13, 2011

(54) METHOD AND SYSTEM FOR INTELLIGENT PROCESSING OF ELECTRONIC INFORMATION

(76) Inventor: Blake Bookstaff, Knoxville, TN (US)

( * ) Notice: Subject to any disclaimer, the term of this patent is extended or adjusted under 35 U.S.C. 154(b) by 570 days.

(21) Appl. No.: 11/636,226

(22) Filed: Dec. 8, 2006

(65) Prior Publication Data
US 2007/0106654 A1    May 10, 2007

Related U.S. Application Data

(63) Continuation-in-part of application No. 11/170,263, filed on Jun. 29, 2005, now Pat. No. 7,720,828.

(60) Provisional application No. 60/583,960, filed on Jun. 29, 2004.

(51) Int. Cl.
G06F 3/048 (2006.01)
G06F 15/16 (2006.01)
G06F 15/00 (2006.01)
G06F 17/30 (2006.01)
G06F 15/173 (2006.01)

(52) U.S. Cl. . 715/748; 715/854; 715/716; 707/E17.107; 707/E17.108; 707/E17.109; 707/E17.11; 709/224

(58) Field of Classification Search ........... 707/E17.107, 707/E17.108, E17.109, E17.11; 709/224; 715/748, 854, 716
See application file for complete search history.

(56) References Cited

U.S. PATENT DOCUMENTS

| | | |
|---|---|---|
| 3,928,724 A | 12/1975 | Byram et al. |
| 4,053,949 A | 10/1977 | Recca et al. |
| 4,071,698 A | 1/1978 | Barger, Jr. et al. |
| 4,232,199 A | 11/1980 | Boatwright et al. |
| 4,446,337 A | 5/1984 | Cofer |
| 4,451,704 A | 5/1984 | Winkelman |
| 4,608,460 A | 8/1986 | Carter et al. |
| 4,654,482 A | 3/1987 | DeAngelis |
| 4,791,666 A | 12/1988 | Cobb et al. |
| 4,850,007 A | 7/1989 | Marino et al. |
| 4,897,866 A | 1/1990 | Majmudar et al. |
| 4,918,719 A | 4/1990 | Daudelin |
| 4,943,995 A | 7/1990 | Daudelin et al. |

(Continued)

FOREIGN PATENT DOCUMENTS

EP    1 662 366 A1    5/2006

(Continued)

OTHER PUBLICATIONS

Partial PCT Search Report PCT/US2003/035,617.

(Continued)

*Primary Examiner* — Chat C. Do
*Assistant Examiner* — Jordany Núñez
(74) *Attorney, Agent, or Firm* — Lesavich High-Tech Law Group, P.C.; Stephen Lesavich

(57) ABSTRACT

A method and system for intelligent electronic information processing. The method and system include selecting one or more portions of a set of electronic information including any unwanted portions that have been reviewed and are to be eliminated from display. The selected portions are recording thereby eliminating any unwanted previously reviewed portions of the set of electronic information from display with any additional sets of electronic information. The method and system may be used to review search engine results, electronic auction results, syndicated news items and to purchase tickets for transportation and events and for reserving lodging.

16 Claims, 6 Drawing Sheets

U.S. PATENT DOCUMENTS

| | | | |
|---|---|---|---|
| 4,959,855 A | 9/1990 | Daudelin | |
| 4,975,941 A | 12/1990 | Morganstein et al. | |
| 4,979,206 A | 12/1990 | Padden et al. | |
| 5,131,024 A | 7/1992 | Pugh et al. | |
| 5,377,354 A | 12/1994 | Scannell | |
| 5,425,097 A | 6/1995 | Pula | |
| 5,448,625 A | 9/1995 | Lederman | |
| 5,473,671 A | 12/1995 | Partridge, III | |
| 5,475,746 A | 12/1995 | Miller et al. | |
| 5,485,511 A | 1/1996 | Iglehart et al. | |
| 5,515,098 A | 5/1996 | Carles | |
| 5,544,236 A | 8/1996 | Andruska et al. | |
| 5,619,562 A | 4/1997 | Maurer et al. | |
| 5,642,407 A | 6/1997 | He | |
| 5,652,784 A | 7/1997 | Blen et al. | |
| 5,661,788 A | 8/1997 | Chin | |
| 5,701,419 A | 12/1997 | McConnell | |
| 5,734,710 A | 3/1998 | Hirth et al. | |
| 5,751,802 A | 5/1998 | Carr et al. | |
| 5,757,899 A | 5/1998 | Boulware et al. | |
| 5,802,149 A | 9/1998 | Hanson | |
| 5,825,862 A | 10/1998 | Voit et al. | |
| 5,835,570 A | 11/1998 | Wattenbarger | |
| 5,852,775 A | 12/1998 | Hidary | |
| 5,873,032 A | 2/1999 | Cox et al. | |
| 5,875,231 A | 2/1999 | Farfan et al. | |
| 5,878,338 A | 3/1999 | Alperovich et al. | |
| 5,880,770 A | 3/1999 | Ilcisin et al. | |
| 5,892,820 A | 4/1999 | Armstrong et al. | |
| 5,943,410 A | 8/1999 | Shaffer et al. | |
| 5,966,437 A | 10/1999 | Cox et al. | |
| 5,983,544 A | 11/1999 | Fagan | |
| 6,031,904 A | 2/2000 | An et al. | |
| 6,035,190 A | 3/2000 | Cox et al. | |
| 6,038,307 A | 3/2000 | Fahrer et al. | |
| 6,061,439 A | 5/2000 | Bleile et al. | |
| 6,084,628 A | 7/2000 | Sawyer | |
| 6,104,786 A | 8/2000 | Gibilisco et al. | |
| 6,118,860 A | 9/2000 | Hillson et al. | |
| 6,178,446 B1 | 1/2001 | Gerszberg et al. | |
| 6,188,751 B1 | 2/2001 | Scherer | |
| 6,198,812 B1 | 3/2001 | Weber | |
| 6,205,215 B1 | 3/2001 | Dombakly | |
| 6,256,515 B1 | 7/2001 | Cox et al. | |
| 6,301,338 B1 | 10/2001 | Makela | |
| 6,301,342 B1 | 10/2001 | Ander et al. | |
| 6,310,948 B1 | 10/2001 | Nemeth | |
| 6,324,273 B1 | 11/2001 | Alcott | |
| 6,327,343 B1 | 12/2001 | Epstein et al. | |
| 6,327,344 B1 | 12/2001 | Paxson | |
| 6,347,225 B1 | 2/2002 | Nishiyama | |
| 6,353,852 B1 | 3/2002 | Nestoriak, III et al. | |
| 6,381,320 B1 | 4/2002 | Creamer et al. | |
| 6,400,804 B1 | 6/2002 | Bilder | |
| 6,456,709 B1 | 9/2002 | Cox et al. | |
| 6,473,612 B1 | 10/2002 | Cox et al. | |
| 6,487,553 B1* | 11/2002 | Emens et al. | 707/E17.108 |
| 6,504,912 B1 | 1/2003 | Glossbrenner | |
| 6,516,311 B1 | 2/2003 | Yacoby | |
| 6,587,138 B1 | 7/2003 | Vogt et al. | |
| 6,587,549 B1 | 7/2003 | Weik | |
| 6,590,970 B1 | 7/2003 | Cai et al. | |
| 6,594,654 B1* | 7/2003 | Salam et al. | 707/3 |
| 6,597,769 B2 | 7/2003 | Snow | |
| 6,614,896 B1 | 9/2003 | Rao | |
| 6,618,474 B1 | 9/2003 | Reese | |
| 6,633,850 B1 | 10/2003 | Gabbard | |
| 6,668,281 B1 | 12/2003 | Ayyadurai | |
| 6,718,551 B1 | 4/2004 | Swix et al. | |
| 6,801,906 B1* | 10/2004 | Bates et al. | 707/3 |
| 6,856,673 B1 | 2/2005 | Banks et al. | |
| 6,961,731 B2* | 11/2005 | Holbrook | 1/1 |
| 6,965,919 B1 | 11/2005 | Woods et al. | |
| 6,977,997 B2 | 12/2005 | Shioda et al. | |
| 7,013,323 B1 | 3/2006 | Thomas | |
| 7,076,743 B2* | 7/2006 | Ingram et al. | 715/854 |
| 7,100,199 B2 | 8/2006 | Ginter | |
| 7,187,761 B2 | 3/2007 | Bookstaff | |
| 7,227,936 B2 | 6/2007 | Bookstaff | |
| 7,447,688 B2* | 11/2008 | Dietz et al. | 707/5 |
| 7,573,993 B2 | 8/2009 | Bookstaff | |
| 7,720,828 B2 | 5/2010 | Bookstaff | |
| 2001/0012344 A1 | 8/2001 | Kwon | |
| 2002/0044639 A1 | 4/2002 | Shioda et al. | |
| 2002/0049968 A1 | 4/2002 | Wilson et al. | |
| 2002/0051521 A1 | 5/2002 | Patrick | |
| 2002/0091566 A1 | 7/2002 | Siegel | |
| 2002/0107730 A1 | 8/2002 | Bernstein | |
| 2002/0193095 A1 | 12/2002 | Hutcheson et al. | |
| 2002/0194061 A1 | 12/2002 | Himmel et al. | |
| 2003/0007620 A1 | 1/2003 | Elsey et al. | |
| 2003/0033198 A1 | 2/2003 | Flannery et al. | |
| 2003/0041126 A1 | 2/2003 | Buford | |
| 2003/0050837 A1 | 3/2003 | Kim | |
| 2003/0063721 A1 | 4/2003 | Hirose | |
| 2003/0097357 A1* | 5/2003 | Ferrari et al. | 707/3 |
| 2003/0161464 A1 | 8/2003 | Rodriguez et al. | |
| 2003/0177063 A1 | 9/2003 | Currans et al. | |
| 2003/0212710 A1 | 11/2003 | Guy | |
| 2003/0223563 A1 | 12/2003 | Wolmuth | |
| 2003/0231754 A1 | 12/2003 | Stein et al. | |
| 2004/0023644 A1 | 2/2004 | Montemer | |
| 2004/0039781 A1 | 2/2004 | Horvitz et al. | |
| 2004/0107125 A1 | 6/2004 | Guheen et al. | |
| 2004/0220902 A1* | 11/2004 | Gates et al. | 707/3 |
| 2005/0080767 A1* | 4/2005 | Dietz et al. | 707/3 |
| 2005/0182673 A1 | 8/2005 | Marzian et al. | |
| 2005/0216457 A1 | 9/2005 | Walther | |
| 2005/0289113 A1 | 12/2005 | Bookstaff | |
| 2006/0047649 A1* | 3/2006 | Liang | 707/4 |
| 2006/0122972 A1* | 6/2006 | Keohane et al. | 707/3 |
| 2006/0161524 A1 | 7/2006 | Roy | |
| 2007/0043721 A1* | 2/2007 | Ghemawat et al. | 707/7 |
| 2007/0106654 A1 | 5/2007 | Bookstaff | |
| 2007/0130030 A1 | 6/2007 | Bookstaff | |
| 2007/0253544 A1 | 11/2007 | Bookstaff | |
| 2009/0168987 A1 | 7/2009 | Bookstaff | |
| 2009/0175431 A1 | 7/2009 | Bookstaff | |
| 2009/0175433 A1 | 7/2009 | Bookstaff | |

FOREIGN PATENT DOCUMENTS

| | | |
|---|---|---|
| WO | WO 00/38399 A | 6/2000 |
| WO | WO 01/47264 A | 6/2001 |
| WO | WO 2004/029759 | 4/2004 |
| WO | WO 2004/042525 | 5/2004 |
| WO | WO 2007/024868 A2 | 3/2007 |

OTHER PUBLICATIONS

Partial PCT Search Report PCT/US2005/023,495.

Partial European Search Report EP 08 01 8481 Dated: Nov. 28, 2008.

Webwasher Com AG (Mar. 28, 2000), XP-002156461: Siemens-Backed WebWasher Empowers Companies to Remove Unwanted Web Content and Ensure Privacy Protection, Internet Citation, URL:http//www.seomoz.org/blogdetail.php?|, 2 pages.

"Yahoo Block" Internet Citation, [Online] (Jun. 18, 2005), XP-002413362 Retrieved from the Internet: URL:http://www.seomoz.ort/blogdetail.php?| D=206> [retrieved on Jan. 3, 2007] the whole document.

http://gmail.google.com, Jun. 16, 2004, retrived on Feb. 14, 2007 at http://archive.org/web/web.php by Canadian Patent Office.

Partial Canadian Patent Office Search Report 2,569,529, Feb. 22, 2007.

Partial PCT Search Report PCT/US2007/024,995.

\* cited by examiner

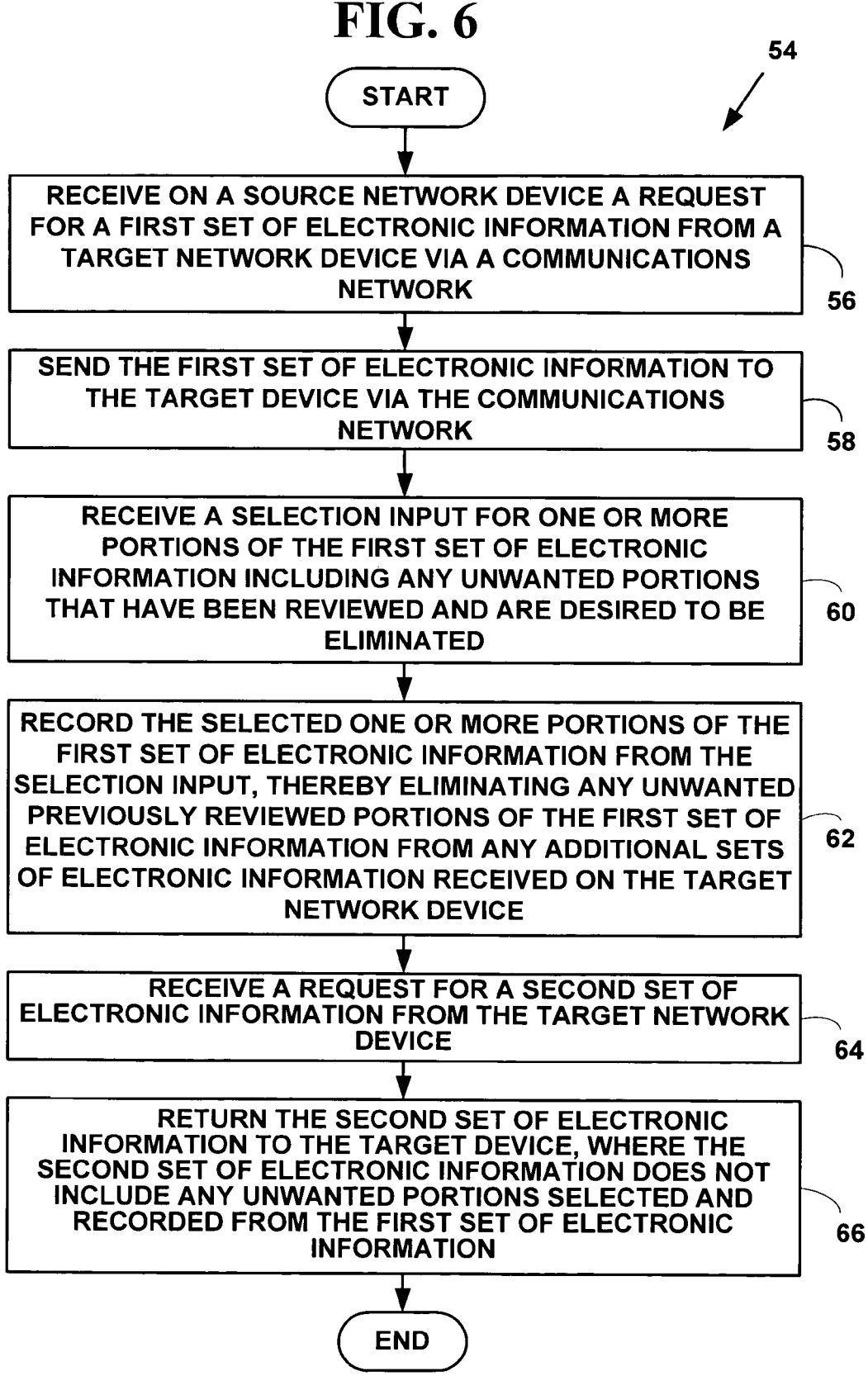

METHOD AND SYSTEM FOR INTELLIGENT PROCESSING OF ELECTRONIC INFORMATION

CROSS-REFERENCE TO RELATED APPLICATIONS

This application is a Continuation-In-Part (CIP) of U.S. application Ser. No. 11/170,263, filed Jun. 29, 2005, that claims priority to U.S. Provisional Patent application 60/583,960, filed Jun. 29, 2004, the contents of all of which are incorporated by reference.

FIELD OF INVENTION

This application relates to automatic processing of electronic information. More specifically, it relates to a method and system for intelligent process of electronic information.

BACKGROUND OF THE INVENTION

The Internet and World-Wide-Web have changed the way organizations conduct business. Virtually every organization has a web-site that provides information about the organization and a description of the goods and/or services an organization may offer. As is known in the art, a "web-site" is group of related mark-up language documents and associated graphics and multi-media files, scripts, and databases, etc. that are served up by a server on the World-Wide-Web via the Internet. Business organizations also provide an electronic commerce (e-commerce) interface that allows users to purchase goods and/or services from such organizations.

There are many different type of web-sites on a spectrum ranging from very simple to very complex. Designing, implementing and deploying a web-site requires knowledge of markup languages such as Hyper Text Markup Language (HTML), eXtensible Markup Language (XML), programming languages such as JAVA, C++, C#, computer graphics functionality, multi-media functionality, etc. A knowledge of communications protocols such as Hyper Text Transfer Protocol (HTTP), Transmission Control Protocol (TCP), Internet Protocol (IP), e-mail protocols such as Simple Mail Transfer Protocol (SMTP), e-commerce protocols, encryption and other security protocols and many other types of protocols for various kinds of web functionalities.

Web-sites are searched for a wide variety of electronic information. Search engines such as Google, Lycos, Yahoo, etc. auction sites such as Ebay, news sites, and blog or other search sites or a browser, depending on settings, will highlight in a different color via a hyperlink search results that have been reviewed previously. However, such sites or browsers do not eliminate the results altogether from the results, causing a user to have to differentiate which highlighted items the user was interested in and which items the user was not interested in. Such search engines also do not transfer the highlighted results from computer to computer or user to user or login to login. They also do may not retain highlighted previously reviewed sites for any period of time.

There have been attempts to solve some of the problems associated with managing information items retrieved from search engines, electronic auctions and other sources. For example, U.S. Pat. No. 6,850,934, entitled "Adaptive search engine query," that issued to Bates, et al. teaches "embodiments provide a method, article of manufacture, and apparatus for searching for information on a network of computers using a modified search query. The search query is modified using translation data. The translation data is any information having a predefined association with the search query content. In one aspect, the translation data comprises a location value and a demographic profile value. The location value, demographic profile value, and search content may include any number and types of characters, keywords, symbols, numerals, etc. Upon receiving a search query, a translation program takes step to locate any keywords within the search content, wherein the keywords indicate that translation data is available for modifying the search query. If the search content contains keywords, then steps are taken to modify the query. The modified query may then be executed by a search tool. In some embodiments, the search tool and the translating program are integrated.

U.S. Pat. No. 6,658,432, entitled "Detecting duplicate and near duplicate files," that issued to Pugh et al., teaches "improved duplicate and near-duplicate detection techniques may assign a number of fingerprints to a given document by (i) extracting parts from the document, (ii) assigning the extracted parts to one or more of a predetermined number of lists, and (iii) generating a fingerprint from each of the populated lists. Two documents may be considered to be near-duplicates if any one of their fingerprints match."

U.S. Pat. No. 6,397,218, entitled "Network interactive search engine and method," that issued to Stem et al. teaches "in a search engine server, a method for searching for data in a data network comprising hyperlinked pages comprising the steps of (1) receiving an initial set of network addresses for pages in the data network; (2) receiving a non-negative integer, N, specifying a chain length; (3) receiving a set of at least one search argument comprising search criteria; and (4) performing a search wherein all pages linked to said initial set of addresses by a chain of distance less than or equal to N are examined for compliance with the search criteria, and all pages meeting such criteria are returned as successful objects of the search. According to optional embodiments, the foregoing method can be implemented as a computer readable medium with instructions for performing the above steps, as an application program, or a browser resident at an end user's computer system. It is also possible to implement as a special purpose information handling system."

U.S. Published Patent Application No. 20050010567, entitled "Method and apparatus for dynamic information connection search engine," that was published by Barth et al. teaches "a method and apparatus are provided for a dynamic information connection engine. User actions are detected on at least one client system. In response, a determination is made whether the user is searching for supported information. When the user is searching for supported information, information is extracted electronically from third party web sites, direct supplier connections, and intermediate databases. Potential information suppliers are automatically selected in response to the detected user search. Queries are formulated from the user search and transferred to each selected supplier over a network coupling. The queries include a request for information. Responses are received from the suppliers, and the responses are used to generate a result list for the user. The result list includes information and query status information. Further, an electronic link may be provided to a web site of each supplier from which the information was derived."

U.S. Published Patent Application No. 20020138479, entitled "Adaptive search engine query," that was published by Lee et al. teaches "embodiments provide a method, article of manufacture, and apparatus for searching for information on a network of computers using a modified search query. The search query is modified using translation data. The translation data is any information having a predefined association with the search query content. In one aspect, the translation data comprises a location value and a demographic profile value. The location value, demographic profile value, and search content may include any number and types of characters, keywords, symbols, numerals, etc. Upon receiving a search query, a translation program takes step to locate any keywords within the search content, wherein the keywords indicate that translation data is available for modifying the search query. If the search content contains keywords, then steps are taken to modify the query. The modified query may then be executed by a search tool. In some embodiments, the search tool and the translating program are integrated."

However, none of these solutions solve all of the problems associated with managing information items retrieved from search engines, electronic auctions and other sources. Thus, it is desirable to provide method and system for eliminating previously viewed electronic information from subsequent display. The eliminated electronic information should be eliminated across computer or logins.

SUMMARY OF THE INVENTION

In accordance with preferred embodiments of the invention, some of the problems associated with electronic advertising are overcome. A method and system for intelligent electronic information is presented.

The method and system include selecting one or more portions of a set of electronic information including any unwanted portions that have been reviewed and are to be eliminated from display. The selected portions are recording thereby eliminating any unwanted previously reviewed portions of the set of electronic information from display with any additional sets of electronic information. The method and system may be used to review search engine results, electronic auction results, syndicated news items and to purchase tickets for transportation and events and for reserving lodging.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 6 is a flow diagram illustrating a method for intelligent electronic information processing.

DETAILED DESCRIPTION OF THE INVENTION

Examplery Electronic Information Message Processing System

Figure 1:
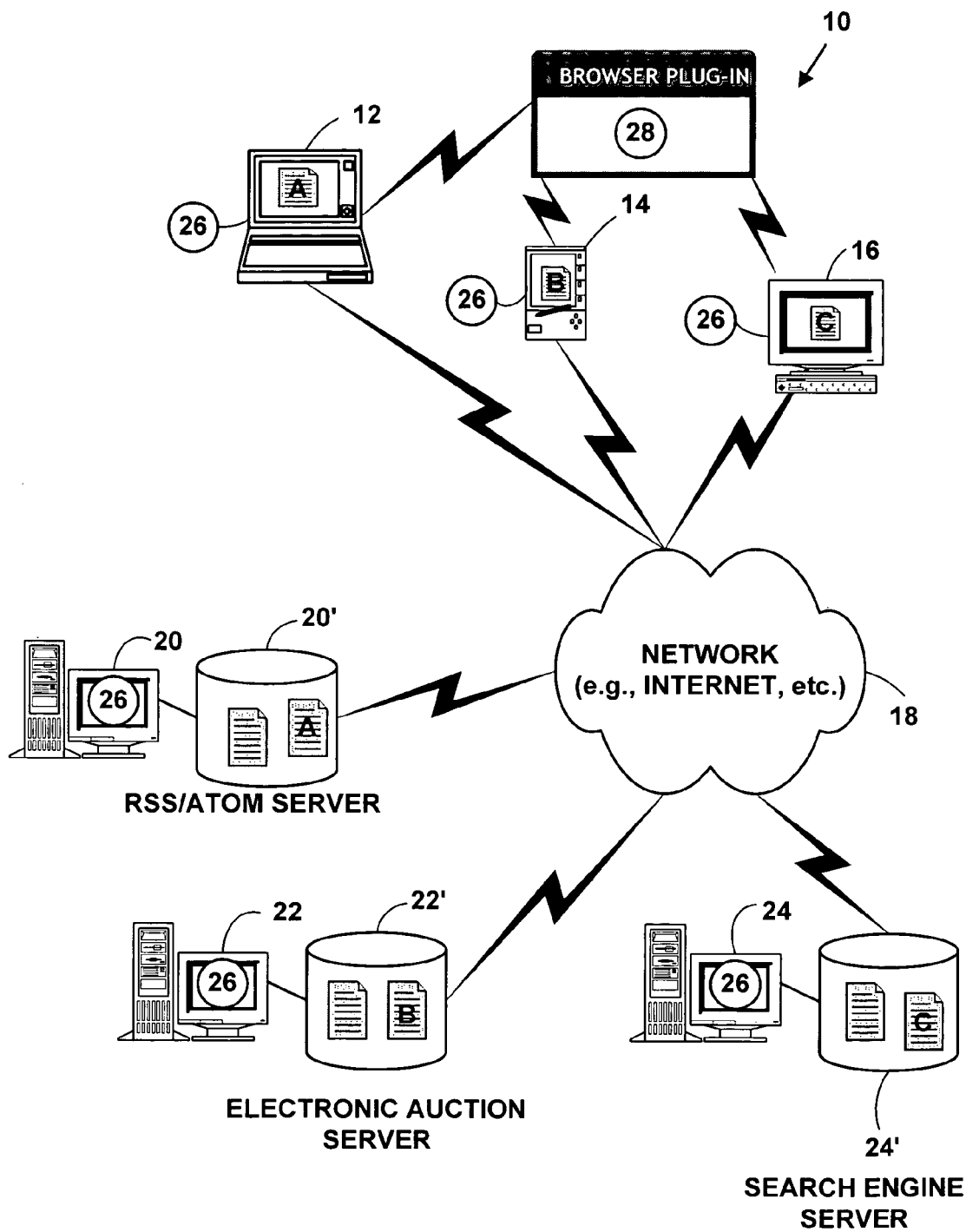
FIG. 1 is a block diagram illustrating an exemplary electronic information message processing system.

FIG. 1 is a block diagram illustrating an exemplary electronic information message processing system 10. The exemplary electronic information message processing system 10 includes, but is not limited to, one or more target network devices 12, 14, 16 (only three of which are illustrated). The target network devices 12, 14, 16 including, but are not limited to, non-mobile computers, wireless devices, laptop computers, mobile phones, personal information devices, personal digital/data assistants (PDA), hand-held devices, network appliances, Internet appliances, two-way pagers, etc. However, the present invention is not limited to these target electronic devices and more, fewer or others types of target electronic devices can also be used. The target network devices 12, 14, 16 function as client devices in some instances and server devices in other instances.

The target network devices 12, 14, 16 are in communications with a communications network 18. The communications network 18 includes, but is not limited to, the Internet, an intranet, a wired Local Area Network (LAN), a wireless LAN (WiLAN), a Wide Area Network (WAN), a Metropolitan Area Network (MAN), Public Switched Telephone Network (PSTN) and other types of communications networks 18 providing voice, video and data communications with wired or wireless communication protocols.

Plural server network devices (source network devices) 20, 22, 24 (only three of which are illustrated) include one or more associated databases 20', 22', 24'. The plural source network devices 20, 22, 24 are in communications with the one or more target network devices 12, 14, 16 via the communications network 18. The plural source network devices 20, 22, 24, include, but are not limited to, electronic mail (e-mail) servers, World Wide Web servers, Internet servers, file servers, other types of electronic information servers, and other types of server network devices (e.g., edge servers, firewalls, routers, gateways, switches, etc.).

The communications network 18 may include one or more gateways, routers, bridges, switches. As is known in the art, a gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments. Switches typically operate at the data link layer and sometimes the network layer and therefore support virtually any packet protocol.

In one embodiment, the target network devices 12, 14, 16 and the source network devices 20, 22, 24 include an application 26 with plural software modules. The multiple software modules may be implemented in firmware, hardware or any combination thereof. In one embodiment, the target network devices 12, 14, 16 may include a plug-in 28 for a browser with plural software modules.

Preferred embodiments of the present invention include devices that are compliant with all or part of standards proposed by the Institute of Electrical and Electronic Engineers ("IEEE"), International Telecommunications Union-Telecommunication Standardization Sector ("ITU"), European Telecommunications Standards Institute (ETSI), Internet Engineering Task Force ("IETF"), U.S. National Institute of Security Technology ("NIST"), American National Standard Institute ("ANSI"), Wireless Application Protocol ("WAP") Forum, Data Over Cable Service Interface Specification (DOCSIS), Bluetooth Forum, or the ADSL Forum. However, network devices based on other standards could also be used. IEEE standards can be found on the World Wide Web at the Universal Resource Locator ("URL") "www.ieee.org." The ITU, (formerly known as the CCITT) standards can be found at the URL "www.itu.ch." ETSI standards can be found at the URL "www.etsi.org." IETF standards can be found at the URL "www.ietf.org." The NIST standards can be found at the URL "www.nist.gov." The ANSI standards can be found at the URL "www.ansi.org." DOCSIS documents can be found at the URL "www.cablemodem.com." Bluetooth Forum documents can be found at the URL "www.bluetooth.com." WAP Forum documents can be found at the URL "www.wap-forum.org." ADSL Forum documents can be found at the URL "www.adsl.com."

The target devices 12, 14, 16 include a protocol stack with multiple layers based on the Internet Protocol or Opens Systems Interconnection (OSI) reference model. The protocol stack includes, but is not limited to, Transmission Control Protocol (TCP), User Datagram Protocol (UDP), Internet Protocol (IP), Hypertext Transfer Protocol (HTTP), Simple Mail Transfer Protocol (SMTP), Post Office Protocol version 3 (POP3), Internet Mail Access Protocol (IMAP), instant-messaging (IM) and other protocols.

TCP provides a connection-oriented, end-to-end reliable protocol designed to fit into a layered hierarchy of protocols that support multi-network applications. For more information on TCP 58 see RFC-793, incorporated herein by reference.

UDP provides a connectionless mode of communications with datagrams in an interconnected set of networks. For more information on UDP see ITEF RFC-768, incorporated herein by reference.

IP is an addressing protocol designed to route traffic within a network or between networks. For more information on IP 54 see IETF RFC-791, incorporated herein by reference.

HTTP is a standard protocol for communications on the World Wide Web. For more information on HTTP, see IETF RFC-2616, incorporated herein by reference.

SMTP is a protocol for sending e-mail messages between devices including e-mail servers. For more information on SMTP, see IETF RFC-821 and RFC-2821, incorporated herein by reference.

POP3 is a protocol for a protocol used to retrieve e-mail from a mail server. For more information on POP3, see IETF RFC-1939, incorporated herein by reference.

IMAP is a protocol for retrieving e-mail messages from a server. For more information on IMAP, see IETF RFC-1730, incorporated herein by reference.

An Instant Message (IM) is a "short," real-time or near-real-time message that is sent between two or more end user devices such (computers, personal digital/data assistants (PDAs) mobile phones, etc.) running IM client applications. An IM is typically a short textual message. Examples of IM messages include America Online's Instant (AIM) messaging service, Microsoft Network (MSN) Messenger, Yahoo Messenger, and Lycos ICQ Instant Messenger, IM services provided by telecom providers such as T-Mobile, Verizon, Sprint, and others that provide IM services via the Internet and other wired and wireless communications networks. In one embodiment of the present invention, the IM protocols used meet the requirements of Internet Engineering Task Force (IETF) Request For Comments (RFC)-2779, entitled "Instant Messaging/Presence Protocol Requirements." However, the present invention is not limited to such an embodiment and other IM protocols not compliant with IETF RFC 2779 may also be used.

Really Simple Syndication or Rich Site Summary (RSS) is a family of content distribution and republication (i.e., syndication) protocols primarily used by news sites and weblogs.

The Rich Site Summary (RSS) is also know as RSS 0.91, 0.92 and RSS 2.x. The Resource Description Framework (RDF) Site Summary (also RSS) is based on Netscape's RSS 0.90, which uses the World Wide Web Consortium (W3C) Resource Description Framework Standard known as RSS 1.x.

RSS provides a lightweight eXtensible Markup Language (XML) format designed for sharing electronic information such as news headlines and other electronic content on the World-Wide-Web. RSS was first developed by Netscape to drive channels for the Netscape Netcenter.

RSS defines an XML grammar for sharing electronic information. Each RSS text file contains both static information about a web-site, plus dynamic information about new electronic content, all surrounded by matching start and end tags.

Each RSS channel can contain up to fifteen items. Once information about each item is in RSS format, an RSS-aware program can check the feed for changes and react to the changes in an appropriate way.

RSS was developed built on the idea that a content provider provides an RDF XML page (i.e., RSS feed), and other web users can choose to subscribe to that page. Any time the RDF XML page is updated (e.g., a webblog, etc.) an item to the RSS feed. More information on RSS can be found on the World-Wide-Wed at the Uniform Resource Locator (URL) "blogs.law.harvard.edu/tech/rss."

"ATOM" is an XML-based file format intended to allow lists of related information, known as "feeds," to be synchronized between publishers and consumers. Feeds are composed of a number of items, known as "entries", each with an extensible set of attached metadata. For example, each entry has a title. More information about ATOM is available on the Internet at the URL "atomenabled.org."

As is known in the art, the Internet Protocol reference model is a layered architecture that standardizes levels of service for the Internet Protocol suite of protocols. The Internet Protocol reference model comprises in general from lowest-to-highest, a link, network, transport and application layer.

As is known in the art, the OSI reference model is a layered architecture that standardizes levels of service and types of interaction for computers exchanging information through a communications network. The OSI reference model separates network device-to-network device communications into seven protocol layers, or levels, each building-and relying—upon the standards contained in the levels below it. The OSI reference model includes from lowest-to-highest, a physical, data-link, network, transport, session, presentation and application layer. The lowest of the seven layers deals solely with hardware links; the highest deals with software interactions at the application-program level.

An operating environment for the devices of the electronic information processing system 10 include a processing system with one or more high speed Central Processing Unit(s) ("CPU"), processors and one or more memories. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical signals by the CPU or processor. An electrical system represents data bits which cause a resulting transformation or reduction of the electrical signals, and the maintenance of data bits at memory locations in a memory system to thereby reconfigure or otherwise alter the CPU's or processor's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM"), flash memory, etc.) mass storage system readable by the CPU. The computer readable medium includes cooperating or interconnected computer readable medium, which exist exclusively on the processing system or can be distributed among multiple interconnected processing systems that may be local or remote to the processing system.

Intelligent Electronic Information Processing from a Target Network Device

Figure 2:
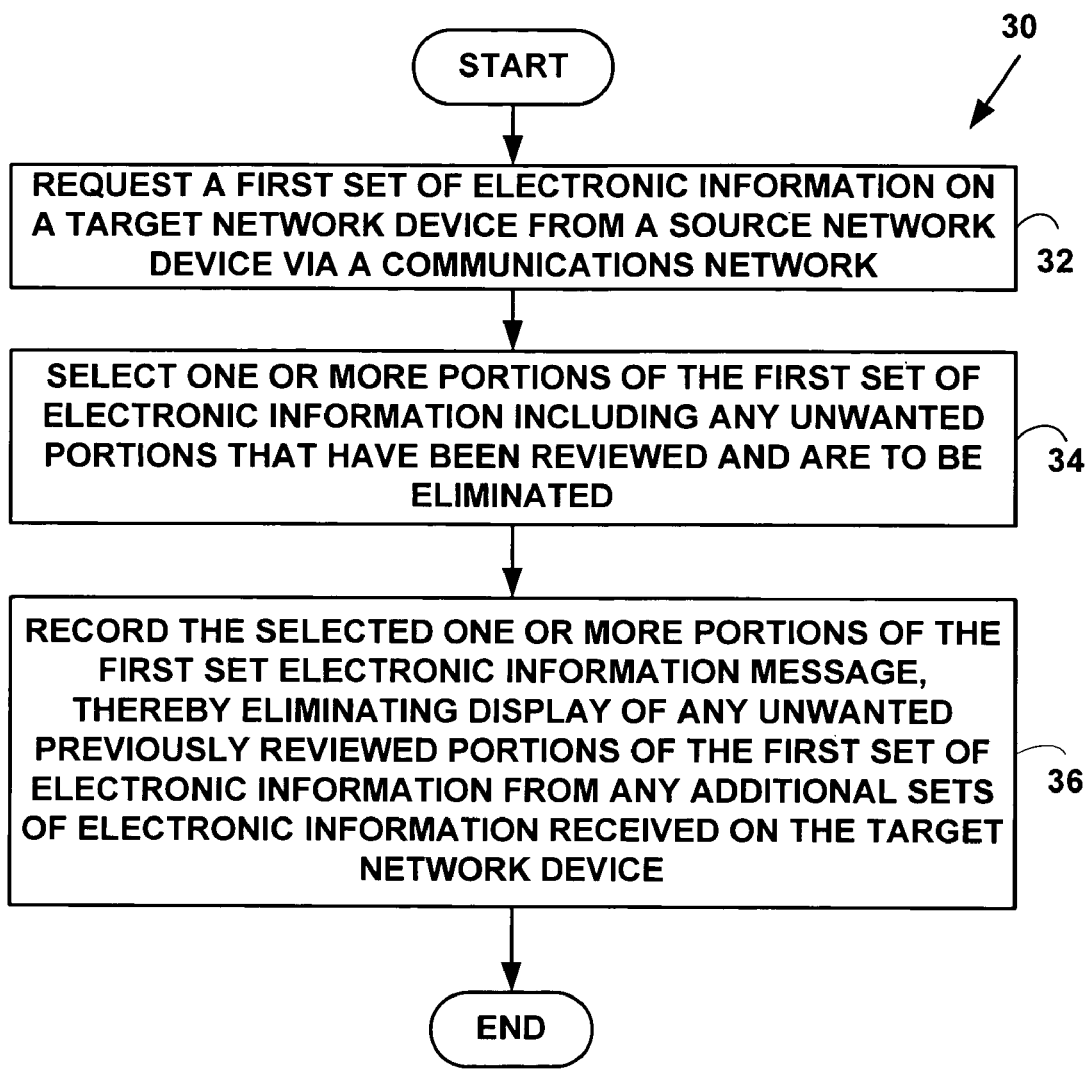
FIG. 2 is a flow diagram illustrating a method for intelligently processing electronic information.

FIG. 2 is a flow diagram illustrating a Method 30 for intelligent electronic information processing. At Step 32, a first set of electronic information is requested on a target network device 12, 14, 16 via a communications network 18 from a source network device 20, 22, 24. At Step 34, one or more portions of the first set of electronic information are selected including any unwanted portions that have been reviewed and are to be eliminated from further display. At Step 36, the selected one or portions of the first set electronic information are recorded thereby eliminating display of any unwanted previously reviewed portions of the first set of electronic information from any additional sets of electronic information received on the target network device 12, 14, 16.

In one embodiment, Method 30 further includes Step 37, a second set of electronic information is requested on the target network device 12, 14, 16 from the source network device 20, 22, 24. The second set of electronic information does not include any portions of the first set of electronic information selected and recorded at Steps 34 and 36. However, the present invention is not limited to Method 30 with Step 37 and can be practiced without Step 37.

Method 30 is illustrated with an exemplary embodiment. However, the present invention is not limited to such an exemplary embodiment and other embodiment can be used to practice the invention.

In such an exemplary embodiment at Step 32, a first set of electronic information is requested on a target network device 12, 14, 16 via a communications network 18 from a source network device 20, 22, 24. In one embodiment, the first set of electronic information search results from a search engine 22, 24. In another embodiment, the first set of electronic information includes a set of electronic auction items such as those provided by Ebay of San Jose, Calif. and others. In another embodiment, the first set of electronic information includes electronic news items, either syndicated or non-syndicated from an RSS or ATOM feed. However, the present information is not limited to such embodiments and other types of electronic information can also be used to practice the invention.

Figure 3:
FIG. 3 is a block diagram illustrating exemplary search engine results for exemplary search term from a search engine.

FIG. 3 is a block diagram 38 illustrating exemplary search engine results 40 for the exemplary search term "led zeppelin posters" from a search engine.

Returning to FIG. 2 at Step 34, one or more portions of the first set of electronic information 36 are selected including any unwanted portions that have been reviewed and are to be eliminated. In one embodiment, the target network devices include an application 26 or a plug-in 28 for a web browser that allows a user to mark or check off/flag/mark /delete search results/websites/links/items that the user has previously reviewed from a prior search so that those same results/websites/links/items do not show up on a later search and/or at a later login.

In one embodiment, the application 26 or plug-in 28 for the web browser displays a "radio button" for marking unwanted portions of the first set of electronic information. In another embodiment, the application 26 or plug-in 28 for the web browser displays a "check box" for marking the unwanted portions. In another embodiment, the application 26 or plug-in 28 for the browser allows a user to select unwanted (or wanted) portions by selecting the unwanted portions with a mouse, keyboard, stylus, or other selection input device. However, the present invention is not limited to these exemplary embodiments and other embodiments can also be used to practice the invention.

In one embodiment, the application 26 or the plug-in 28 for the web browser on the target device 12, 14, 16 displays the radio buttons, check boxes, or accepts selection inputs to select desired portions of the first set of electronic information. In another embodiment, the application 26 on the source network device displays the radio buttons, check boxes, or accepts selection inputs to select desired portions of the first set of electronic information.

Figure 4:
FIG. 4 is a block diagram illustrating the exemplary search engine results from FIG. 3 with exemplary radio buttons displayed for selecting portions.

FIG. 4 is a block diagram 42 illustrating the exemplary search engine results 40 from FIG. 3 with exemplary radio buttons 44, 46 displayed for selecting portions of electronic information. A first radio button 44 is used to remove unwanted portions. A second radio button 46 is used to keep desired portions. Either the first radio button 44, or the second radio button 46 can be selected, but not both. However, the present invention is not limited to this exemplary embodiment and other embodiments can also be used to practice the invention (e.g., check boxes, etc.).

Returning to FIG. 2 at Step 36, the selected one or more portions of the first set electronic information message from the selection input are recorded thereby eliminating display of any unwanted previously reviewed portions of the first set of electronic information from any additional sets of electronic information received on the target network device 12, 14, 16.

In one embodiment, the selected one or more portions are stored on the target network device 12, 14, 16. In such an embodiment the selected one or more portions are stored on the target network device 12, 14, 16, in the form of a digital cookie by the application 26 or by the plug-in for the browser 28. In another embodiment, the selected one or more portions are stored on the target device 12, 14, 16 in a data structure or data file in the application 26 or the plug-in for the browser 28. In another embodiment, the selected one or more portions are stored on the source network device 20, 22, 24.

At Step 37, a second set of electronic information is requested on the target network device 12, 14, 16 from the source network device 20, 22, 24, wherein the second set of electronic information does not include any portions of the first set of electronic information selected and recorded.

In one embodiment, the application 26 or the plug-in for the web browser 28 uses the digital cookie or data structure or data file to compare any subsequent sets of electronic information requested by the target device 12, 14, 16 with previously viewed and recorded portions from the first set of electronic information. Any previously viewed and recorded portions are not displayed on the target device 12, 14, 16 when any subsequent sets of electronic information are displayed.

In another embodiment, the source network devices 20, 22, 24 uses the recorded information to compare or data structure to compare any subsequent sets of electronic information requested by the target device 12, 14, 16 with previously viewed and recorded portions from the first set of electronic information. Any previously viewed and recorded portions are not forwarded for display on the target device 12, 14, 16.

Figure 5:
FIG. 5 is a block diagram including a second set of electronic information that does not include any portions of the first set of electronic information selected and recorded from FIG. 3.

FIG. 5 is a block diagram 50 including a second set of electronic information that does not include any portions of the first set of electronic information 40 selected and recorded.

As Method 30 illustrates, a user of a target device 12, 14, 16 could perform a search on a search engine and review certain items within that search. The user might get interrupted or not complete his/her review of the search results at that time. When the user returns to the search results at a later time or performed the same search only saved portions or new portions would be displayed for the user. Any previously viewed and discarded portions would not be displayed for the user as is illustrated in FIG. 5. As FIG. 5 also illustrates, Method 30 can also be applied to the second set of electronic information and any additional sets of electronic information requested. This application of Method 30 allows the search results to be iteratively filtered and saved.

A user of a target device 12, 14, 16 could have plural different login accounts to access the source network devices 20, 22, 24. Method 30 allows the search results with the previously viewed and discarded portions to be used across the plural login accounts. If a user performs a search on a first target device 12 and reviews and discards portions of the first set of electronic information and at a later time desires to use the same search results on a second target network device 14, Method 30 is used to allow the same search results to be used across plural target network devices 12, 14.

Intelligent Electronic Information Processing from a Source Network Device

FIG. 6 is a flow diagram illustrating a Method 54 for intelligent electronic information processing. At Step 56, a request is received on a source network device 20, 22, 24 for a first set of electronic information from a target network device 12, 14, 16 via a communications network 18. At Step 58, the first set of electronic information is sent to the target device 12, 14, 16 via the communications network 18. At Step 60, a selection input is received for one or more portions of the first set of electronic information including any unwanted portions that have been reviewed and are to be eliminated from further display. At Step 62, the selected one or more portions of the first set of electronic information from the selection input are recorded, thereby eliminating any unwanted previously reviewed portions of the first set of electronic information from being displayed with any additional sets of electronic information received on the target network device 12, 14, 16. At Step 64, a request is received for a second set of electronic information from the target network device 12, 14, 16. At Step 66, the second set of electronic information is returned to the target device 12, 14, 16. The second set of electronic information does not include any unwanted portions selected and recorded from the first set of electronic information.

Method 54 is illustrated with an exemplary embodiment. However, the present invention is not limited to such an exemplary embodiment and other embodiment can be used to practice the invention.

In such an exemplary embodiment at Step 56, a search engine request, electronic auction request, syndicated or non-syndicated news request, etc. is received on a source network device 20, 22, 24 for a first set of electronic information from a target network device 12, 14, 16 via a communications network 18.

At Step 58, the first set of electronic information 40 is sent to the target device 12, 14, 16 via the communications network 18. In one embodiment, Step 58 includes displaying plural graphical radio buttons 44, 46, a plural graphical check boxes or accepting one or more selection inputs for one or more portions of the first set of electronic information 40 from an application 26 on the source network device 20, 22, 24.

In another embodiment, Step 60 includes receiving a selection input created by displaying plural graphical radio buttons 44, 46, plural graphical check boxes or accepting one or more selection inputs for one or more portions of the first set of electronic information from an application 26 or a browser plug-in 28 on the target network device 12, 14, 16.

At Step 62, a selection input is received for one or more portions of the first set of electronic information including any unwanted portions that have been reviewed and are desired to be eliminated from being displayed.

At Step 64, the selected one or more portions of the first set of electronic information from the selection input are recorded, thereby eliminating any unwanted previously reviewed portions of the first set of electronic information from being displayed with any additional sets of electronic information received on the target network device 12, 14, 16. In one embodiment, Step 60 includes recording the selected one or more portions of the first set of electronic information on the source network device 20, 22, 24.

In another embodiment Step 62 includes sending a message to the target network device 12, 14, 16 requesting recording of the selected one or more portions of the first set of electronic information on the target network device 12, 14, 16. In another embodiment, the recording of the selected one or more portions of the first set of electronic information is automatically recorded on the target network device 12, 14, 16. As was discussed above, the one or more portions of the first set of electronic information are recorded in a digital cookie or in a data structure in the application 26 or the plug-in for the browser on the target network device 12, 14, 16.

At Step 64, a request is received for a second set of electronic information 52 from the target network device 12, 14, 16. At Step 64, the second set of electronic information 52 is returned to the target device 12, 14, 16. The second set of electronic information 52 does not include any portions selected and recorded from the first set of electronic information 40 for display.

Methods 30 and 54 can also be used for ticket purchasing for events and transportation (e.g., airline tickets, bus tickets, train tickets, rental cars, etc.) and for reserving lodging (e.g., hotel rooms, etc.). For example, when a user desires to buy tickets for a popular concert, many different ticket purchasing sites may be provided (e.g., tickets.com, e-tickets.com, cheaptickets.com, ticketmaster.com, etc.) Many of these different ticket purchasing sites have a similar looking interface. The methods and system described herein can be used to allow a user to review ticket prices and seat locations on many different ticket purchasing sites and keep track of what sites and ticket packages were reviewed on travel sites such as expedia.com, orbitz.com, hotels.com, etc.

It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

I claim:

1. A method for intelligently processing electronic information, comprising:
   requesting a first set of electronic information on an application on a target network device with one or more processors from a source network device with one or more processors via a communications network;
   selecting with the application one or more portions of the first set of electronic information received from the source network device including any unwanted portions that have been reviewed and are to be eliminated from display on the target network device;
   recording with the application the selected one or more portions of the first set electronic information in a data structure in a non-transitory computer readable medium on the target network device, thereby eliminating any unwanted previously reviewed portions of the first set of electronic information from further display with any additional sets of electronic information received on the target network device;
   allowing the recorded one or more portions of the first set of electronic information on the target network device to be used from the non-transitory computer readable medium on the target network device from a plurality of other target network devices from a same user of the target network device and connected to the communications network and using the non-transitory computer readable medium from a plurality of different login accounts from the same user of on a plurality other source network devices different from the source network device, thereby removing any unwanted previously reviewed portions of the first set of electronic information from display across the plurality of other target network devices and across the plurality of different logins;
   requesting a second set of electronic information from the application on the target network device from the source network device, wherein the request for the second set of electronic information does not include any unwanted previously reviewed portions selected and recorded from the first set of electronic information;
   comparing the second set of electronic information received on the application on the target network device with the selected one or more portions recorded in the data structure in the non-transitory computer readable medium on the target network device; and
   displaying with the application on the target network device only those portions of the second set of electronic information received on the target network device that are not recorded in the data structure in the non-transitory computer readable medium on the target network device.

2. The method of claim 1 wherein the first set of electronic information includes electronic search engine results, electronic auction results, syndicated electronic news items, non-syndicated electronic news items, tickets for events and transportation or reservations for lodging.

3. The method of claim 1 wherein the selecting step includes displaying a plurality of graphical radio buttons, a plurality of graphical check boxes or accepting one or more selection inputs for one or more portions of the first set of electronic information.

4. The method of claim 3 wherein the selecting step includes displaying plurality of graphical radio buttons, a plurality of graphical check boxes or accepting one or more selection inputs for one or more portions of the first set of electronic information from the application on the target network device or on a plug-in for a browser on the target device.

5. The method of claim 3 wherein the selecting step includes displaying plurality of graphical radio buttons, a plurality of graphical check boxes or accepting one or more selection inputs for one or more portions of the first set of electronic information from an application on the source network device.

6. The method of claim 1 wherein the recording step includes recording the selected one or more portions of the first set of electronic information on the source network device.

7. The method of claim 1 further comprising:
   receiving on the source network device a request for a first set of electronic information from the target network device via the communications network;
   sending the first set of electronic information to the target device via the communications network;
   receiving a selection input for one or more portions of the first set of electronic information including any unwanted portions that have been reviewed and are to be eliminated from display;
   recording the selected one or more portions of the first set of electronic information from the selection input, thereby eliminating any unwanted previously reviewed portions of the first set of electronic information from any additional sets of electronic information received on the target network device;
   receiving a request for a second set of electronic information from the target network device; and
   returning the second set of electronic information to the target device, wherein the second set of electronic information does not include any portions selected and recorded from the first set of electronic information.

8. The method of claim 7 further comprising a computer readable medium having stored therein instructions allowing one or more processors to execute the steps of the method.

9. The method of claim 7 wherein the first set of electronic information includes electronic search engine results, electronic auction results, syndicated electronic news items, non-syndicated electronic news items, tickets for transportation or events or reservations for lodging.

10. The method of claim 7 wherein the step of sending the first set of electronic information to the target device via the communications network includes displaying a plurality of graphical radio buttons, a plurality of graphical check boxes or accepting one or more selection inputs for one or more portions of the first set of electronic information from an application on the source network device.

11. The method of claim 7 wherein the step of receiving a selection input includes receiving a selection input created by displaying a plurality of graphical radio buttons, a plurality of graphical check boxes or accepting one or more selection inputs for one or more portions of the first set of electronic information from the application or a browser plug-in on the target network device.

12. The method of claim 7 wherein the recording step includes recording the selected one or more portions of the first set of electronic information on the source network device.

13. The method of claim 7 wherein the recording step includes sending a message to the target network device requesting recording of the selected one or more portions of the first set of electronic information on the target network device.

14. A system for intelligently processing electronic information, comprising in combination:

means for displaying plurality of graphical radio buttons, a plurality of graphical check boxes or accepting one or more selection inputs for one or more portions of electronic information received and for selecting one or more portions of the received electronic information including any unwanted portions that have been reviewed and are eliminated from display on an application in a non-transitory computer readable medium on a target network device with one or more processors;

means selecting with the application on the target network device one or more portions of the electronic information received on the target network device from a source network device with one or more processors including any unwanted portions that have been reviewed and are to be eliminated from display on the target network device; and means for recording with the application on the target network device the selected one or more portions of the electronic information in a data structure in the non-transitory computer readable medium on the target network device, thereby eliminating any unwanted previously reviewed portions of the electronic information from display with any additional sets of electronic information received on the target network device;

allowing the recorded one or more portions of the first set of electronic information on the target network device to be used from the non-transitory computer readable medium on the target network device from a plurality of other target network devices from a same user of the target network device and connected to the communications network and using the non-transitory computer readable medium from a plurality of different login accounts from the same user of on a plurality other source network devices different from the source network device, thereby removing any unwanted previously reviewed portions of the first set of electronic information from display across the plurality of other target network devices and across the plurality of different logins;

means for requesting a second set of electronic information from the application on the target network device from the source network device, wherein the request for the second set of electronic information does not include any unwanted previously reviewed portions selected and recorded from the first set of electronic information; and means for comparing a second set of electronic information received on the application on the target network device with the selected one or more portions recorded in the data structure and for displaying only those portions of the second set of electronic information received on the target network device that are not recorded in the data structure on the target network device.

15. The system of claim 14, wherein the means for displaying, the means for selecting and the means for recording are included in a plug-in for a browser.

16. A non-transitory computer readable medium having stored therein a plurality of instructions for causing one or more processors on one or more network devices to execute the steps of:

requesting a first set of electronic information on an application on a target network device with one or more processors from a source network device with one or more processors via a communications network;

selecting with the application one or more portions of the first set of electronic information received from the source network device including any unwanted portions that have been reviewed and are to be eliminated from display on the target network device;

recording with the application the selected one or more portions of the first set electronic information in a data structure in a non-transitory computer readable medium on the target network device, thereby eliminating any unwanted previously reviewed portions of the first set of electronic information from further display with any additional sets of electronic information received on the target network device;

allowing the recorded one or more portions of the first set of electronic information on the target network device to be used from the non-transitory computer readable medium on the target network device from a plurality of other target network devices from a same user of the target network device and connected to the communications network and using the non-transitory computer readable medium from a plurality of different login accounts from the same user of on a plurality other source network devices different from the source network device, thereby removing any unwanted previously reviewed portions of the first set of electronic information from display across the plurality of other target network devices and across the plurality of different logins;

requesting a second set of electronic information from the application on the target network device from the source network device, wherein the request for the second set of electronic information does not include any unwanted previously reviewed portions selected and recorded from the first set of electronic information;

comparing the second set of electronic information received on the application on the target network device with the selected one or more portions recorded in the data structure in the non-transitory computer readable medium on the target network device; and displaying with the application on the target network device only those portions of the second set of electronic information received on the target network device that are not recorded in the data structure in the non-transitory computer readable medium on the target network device.

* * * * *